Dec. 28, 1954 A. J. GRANBERG 2,698,158
SLOW-SEATING VALVE ASSEMBLY
Filed March 28, 1952
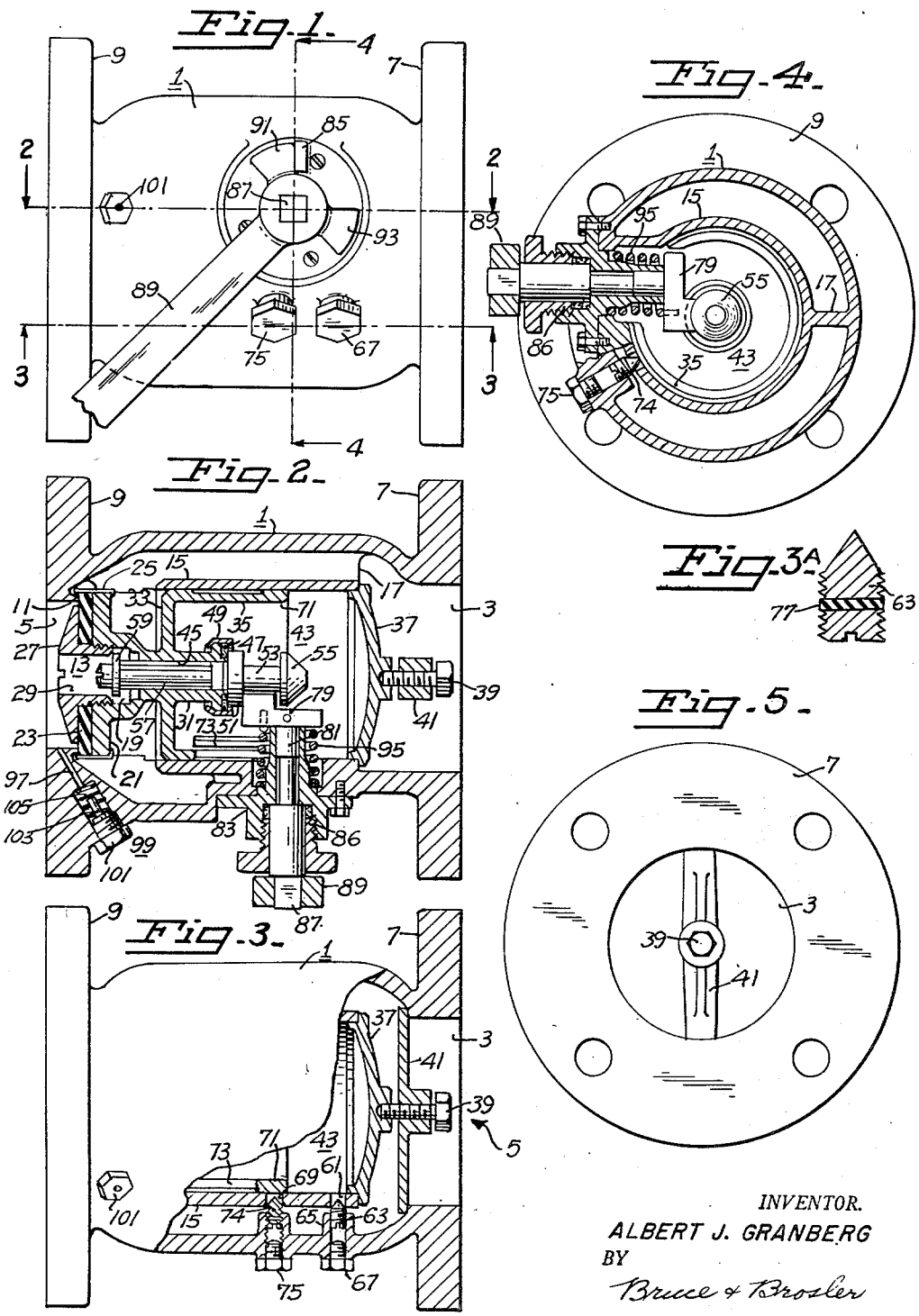
INVENTOR.
ALBERT J. GRANBERG
BY
Bruce & Brosler
HIS ATTORNEYS

United States Patent Office 2,698,158
Patented Dec. 28, 1954

2,698,158

SLOW-SEATING VALVE ASSEMBLY

Albert J. Granberg, Oakland, Calif.

Application March 28, 1952, Serial No. 279,059

6 Claims. (Cl. 251—35)

My invention relates to shut-off valves generally, for use in discharge lines and more particularly to a valve assembly employable in equipment for dispensing of gasoline and other petroleum liquids from storage tanks.

The specific embodiment to be considered herein for purposes of illustration, constitutes an improvement upon the balanced slow-closing valve assembly depicted in Figures 3 through 6 of my Patent No. 2,557,378 of June 19, 1951, though it will be appreciated that the invention is not necessarily limited to the valve assembly so illustrated and described.

In the slow-closing valve assembly of the aforementioned patent, release of the operating handle permitted closing of the valve at a slow rate in accordance with the amount of liquid permitted to leak into a valve-associated chamber. Under certain conditions of operation, as when loading tank trucks, transports, tank cars, etc. the interval of time necessarily involved in the closing of such valve, makes it rather difficult to time the final seating of the valve with the arrival of the liquid in such tank to its desired level, as gauged by a marker within the dome with which such tanks are customarily provided. Consequently, at times there would be a tendency for the liquid to exceed such level and perhaps cause overflowing.

Also, when employed in a system where gravity dispensing of liquid from a storage tank prevails, a vacuum is very likely to develop in the discharge line at the output side of the valve upon closing such valve, attributable to the momentum of the liquid in the discharge line at the time. This changes the loading on the valve and otherwise tends to make operation thereof less uniform and less dependable when such conditions of operation prevail.

Among the objects of the present invention are, (1) To provide a novel and improved shut-off valve;

(2) To provide a novel and improved slow-closing valve assembly in which the closing time is materially shortened without impairing the ability of the valve to seat slowly;

(3) To provide a novel and improved slow-seating valve assembly;

(4) To provide a novel and improved balanced slow-seating valve assembly;

(5) To provide a novel and improved slow-seating valve assembly having a relatively short closing time period.

(6) To provide a novel and improved shut-off valve assembly offering more dependable service in a gravity dispensing system.

Additional objects of my invention will be brought out in the following description of a preferred embodiment of the same taken in conjunction with the accompanying drawings wherein—

Figure 1 is a view in elevation of my improved valve assembly.

Figure 2 is a view in section taken in the plane 2—2 of Figure 1.

Figure 3 is a view partly in section of the valve assembly of Figure 1, to expose certain internal features thereof;

Figure 3A is a view in section of an adjusting screw depicted in the assembly of Figure 3.

Figure 4 is a view in section taken in the planes 4—4 of Figure 1.

Figure 5 is an end view of the valve assembly taken in the direction of the arrow 5 of Figure 3.

Referring to the drawings for specific details of my invention in its preferred form, the same includes a main valve housing 1 of substantially cylindrical form having its input opening 3 at one end and its discharge opening 5 at the opposite end. The housing has a flange 7 at its inlet end for mounting the valve assembly on a meter casing and a similar flange 9 at its discharge end. Bordering the discharge opening about its inner edge, is the valve seat 11 for the main valve 13.

Intermediate the inlet end and the discharge end, is a cylindrical wall 15 supported concentrically with the main valve housing by radial ribs 17 joining this cylindrical wall to the main valve housing. The space between this cylindrical wall and the main valve housing defines the main flow path for liquid passing through the valve.

The main valve comprises a valve head having a central recess 19, bordered by a rimmed flange 21 to receive the valve sealing element 23 in the form of a ring of resilient material such as artificial rubber or the like, such sealing element being held in position against such flange by a bezel 25, and a nut 27 threaded into the recessed valve head, such nut having an axial passage 29 therethrough.

This main valve is formed with an integral rearwardly extending valve stem 31 supporting at an intermediate point thereof, a piston 33 including an apron 35, the piston being of a diameter sufficient to provide a sliding fit along the interior surface of the cylindrical wall. This piston serves as a closure for that end of the cylindrical wall facing the main valve. At its other end, the cylindrical wall is closed by a cap 37 held in position under pressure of an adjusting screw 39 mounted in a brace bar 41 extending across th einlet opening of the main valve housing. The piston and cap together with the cylindrical wall, form a closed chamber 43.

The main valve stem has an axial passage 45 therethrough, providing for communication between the discharge side of the main valve and the aforementioned chamber. At its inner end, this main valve stem carries a ring 47 of resilient sealing material such as artificial rubber or the like, which is clamped to the end of the valve stem by a bezel 49. Such ring of sealing material constitutes a valve seat for a pilot valve 51.

The pilot valve in the present instance is of disk shape having a rearwardly extending stem 53 which terminates in a head 55.

Through the hollow stem of the main valve is a guide stem 57 for the pilot valve, which guide stem is fluted and extends into the recess 19. At its free end, the guide stem carries in spaced relation to the end of the stem passage, a washer 59 of a diameter sufficient to abut the bottom of the recess after the pilot valve has been opened. In the interim, the fluted guide stem will permit equalization of pressure between the chamber and the discharge side of the main valve, following which, opening of the main valve becomes a simple matter as the washer engages the valve head in response to continued retraction of the pilot valve.

A leak passage 61 is provided from the inlet side of the main valve to the chamber 43 preferably through the cylindrical wall 15 at a point not traversed by the piston, whereby the pressure within the chamber during closed conditions of the main valve, will build up to the existing pressure of the liquid on the inlet side of the main valve, and during open conditions of the valve, admission of liquid to said chamber will never be blocked.

Such leak passage is made adjustable by means of a tapered set screw 63 adjustably threaded into a radial passage provided in the main valve housing which at this point has been formed with an inside boss 65. A cap screw 67 closing the entrance to such threaded passage will serve to preclude unauthorized tampering with the adjustment of the leak passage adjustment screw. This arrangement permits of making adjustments without removal of the valve assembly from the meter casing or otherwise disturbing the system.

An additional leak passage 69 is provided through the wall 15, this one however, being located at a point normally contacted and covered by the end 71 of the piston apron in the closed position of the valve 13. A window 73 adjacent the covering end of the apron and in line with the path of movement of the apron across this leak passage said passage to the chamber throughout the stroke of the piston except for that portion representing the approach of the valve to seating position, which may cover on the order of one quarter of the stroke. Thus on the closing stroke of the main valve, both leak passages will be available for the initial three quarters of said stroke, following which, the leak passage 69 will be blocked off, leaving available, only the one leak passage 61.

Like the leak passage 61, the additional leak passage 69 may be made variable by the inclusion of an adjusting screw 74 protected by a cap screw 75.

To reliably hold such adjusting screws in their positions of adjustment, a diametrical passage is drilled through each such screw, into which is driven a resilient plug 77 of rubber or like material, whose length slightly exceeds the diameter of the screw. Upon threading such prepared screw into a threaded leak passage, the plug becomes wedged into the threads to frictionally hold such screw against accidental rotation.

The pilot valve is operable through a crank arm 79 mounted on the inner end of a control stem 81 extending through a bushing 83 mounted on the wall of the main valve housing and having a radial abutment 85 formed therewith.

A packing gland and gland nut assembly 86 surrounding the stem, serves to preclude a leak at this point and more effectively stabilize the stem in its bushing. At its external end, the stem preferably terminates in a square end 87 for application of a suitable control handle 89, which has associated with it a pair of stops 91, 93 disposed for engagement with the abutment to determine the stroke limits of the handle.

A coil spring 95 surrounding the stem has one end anchored to the crank arm while its other end is anchored to the bushing. This spring will then function to restore the pilot valve to closing position upon release of the handle, following the opening of the pilot valve. Preferably the restoring spring is assembled in partially wound condition so as to maintain a positive closing force against the pilot valve in the absence of any turning movement applied to the handle.

At the junction of the flange 9 with the body of the housing, there is a through passage 97 exposing the discharge end of the valve flow path to atmosphere. This passage is enlarged at its outer end to receive an air inlet valve assembly 99, which may involve a vented plug 101 against the inner end of which is valve 103 spring seated by a coil spring 105.

In employing the above described assembly for its intended purpose, it is mounted by means of its inlet flange, to the output side of a meter casing, while to the flange at its discharge end, may be connected a pipe line or suitable hose line. In the quiescent state of such system, liquid entering the piston chamber through the open leak passage, ultimately fills the same at a pressure corresponding to the pressure of the liquid in the previous portion of the system, such pressure in conjunction with the closing pressure of the handle spring cooperating to maintain a leak-type seating of the main valve against its seat.

In opening the valve by rotation of the handle, it will be appreciated that the initial portion of the handle stroke merely serves to dislodge the pilot valve from its seat, whereupon liquid in the piston chamber may flow through the bypass passage in the main valve to thereby neutralize the valve seating pressure previously exerted by the liquid in the piston chamber. Further movement of the handle will thus enable one to open the main valve with ease, the extent of opening movement of the valve handle being determined by the stop associated therewith, whose position is correlated to the desired maximum open position of the main valve.

Following the initial unseating of the main valve, it will be noted that the second leak passage will have become exposed and remains exposed for the remainder of the opening stroke of the piston.

The design and construction of the valve assembly imparts thereto the ability to substantially balance the pressures on both sides of the main valve while the handle is held stationary and liquid is flowing through the valve housing. This may very readily be appreciated by analyzing the operation of the valve assembly when the operator returns the main valve from its full position to an intermediate position, which of course is accomplished merely by partially retracting the handle to such intermediate position.

When held at such intermediate position, the pilot valve will remain stationary at the position determined by the position of the handle. Therefore, any tendency on the part of the main valve to further return toward its seating position must necessarily result in such main valve lifting away from the pilot valve, but as soon as this begins, the hydraulic pressure which tended to move the main valve toward its seat drops slightly below the pressure on the other side of the main valve, and such tendency on the part of the main valve to move is thereby discouraged. Thus, while the main valve is not solidly connected to the handle, it nevertheless follows the pilot valve and is therefore always under control of the operator when manipulating the valve handle, though the rate of closing is wholly beyond the control of such operator when the handle is released, such rate of closing being solely a function of the spring pressure plus that pressure developed by the liquid entering the piston chamber.

Such latter pressure, in turn, is a function of the rate at which such liquid is permitted to enter the piston chamber. Should both leak passages be closed, no return of the main valve to its seating position would be possible, inasmuch as any tendency of this valve to move toward its valve seat would create a condition of vacuum in the piston chamber and thereby preclude movement of the main valve. By this it becomes clear that the rate at which the main valve may move toward its seating position will depend on the rate at which such vacuum condition may be relieved by the admission of liquid through the leak passage, and this of course will be a function of the size of such leak passage.

With the main valve fully open, both leak passages will be unobstructed and upon release of the valve handle, maximum rate of fluid will be permitted into the piston chamber under the prevailing conditions of adjustment of the tapered screws, until the end portion of the piston apron begins to block out the one leak opening which will cause a deceleration in the closing movement of the main valve until such leak opening is fully covered. This is timed to occur just prior to seating of the main valve, whereby the main valve will be caused to seat at a velocity considerably slower than that initially prevailing during its closing stroke.

Thus, by properly correlating the relative capacities of the two leak passages and properly timing the closing of the one leak passage with respect to the actual seating of the main valve, a quite rapid movement of the main valve toward closing may be assured for the greater portion of its closing stroke, following which the main valve may be eased into seating position at a much reduced rate. Thus the actual closing period of the main valve may be accomplished in a much shorter time interval than formerly, where the entire closing movement of said valve occurred at a uniformly slow rate of velocity. The actual instant of seating can therefore be judged more accurately.

Following closing of such a valve in a gravity dispensing system, any tendency toward the creation of a condition of high vacuum at the discharge outlet of such valve will be avoided by the presence of the air inlet valve, which will open automatically, under the prevailing outside atmospheric pressure and admit air into the discharge hose or line.

By making the outer exposed surface of the piston of greater area than the rear surface of the main valve, a balance of pressure will exist in favor of the opening of the main valve which will thus serve to facilitate the initial opening of such valve upon equalization of pressures between the piston chamber and the discharge side of the main valve.

From the foregoing description of my invention in its preferred form, it will be appreciated that the same is subject to alteration and modification without departing from the underlying principles involved. For one thing, the features of the present invention are not limited to a self-balancing type of valve; nor need the leak passage be made up of two separate openings, since a single opening with a piston apron designed to partially cover such opening as the valve approaches seating position can be made to accomplish the same results. And by varying the number and/or position of openings, the closing characteristics of the valve assembly may be altered to satisfy practically any variable closing characteristic desired, even to the extent of reversing the closing characteristics of the valve assembly described above, to obtain a fast seating following a slow closing movement.

Accordingly, while I have disclosed my invention in its preferred form and in considerable detail, I do not desire to be limited in my protection to such details, except as may be necessitated by the appended claims.

I claim:

1. A valve assembly comprising a valve housing having an intake opening and a discharge opening and a main valve seat intermediate said openings, a piston chamber in said housing having an open end, a valve in said housing adapted to fit said seat and having connected therewith a piston slidably receivable in the open end of said piston chamber, means supported by said valve housing and normally urging said valve toward closing position in the absence of restraint, means involving a plurality of leak passages into said piston chamber for admitting liquid to said piston chamber behind said piston during closing of said valve to preclude creation of a vacuum condition therein and thus allow closing movement of said valve, and means for automatically decelerating said valve as it approaches said valve seat during closing, to provide for slow seating of said valve in a relatively fast closing period, said means including an apron as part of said piston in sliding contact with the inner surface of said chamber over that portion containing certain only of said leak passages and traversed by said apron only during the final portion of its return stroke.

2. A valve assembly comprising a valve housing having an intake opening and a discharge opening and a main valve seat intermediate said openings, a cylindrical wall supported in said housing in alignment with said valve seat, means substantially closing that end of said cylindrical wall remote from said valve seat leaving the opposite end open, a valve in said housing adapted to fit said seat and having connected therewith a piston slidably receivable in the open end of said cylindrical wall to define a piston chamber, means supported in said valve housing normally urging said valve toward closing position in the absence of restraint, means involving a plurality of leak passages into said piston chamber for admitting liquid to said piston chamber behind said piston during closing of said valve to preclude creation of a vacuum condition therein and thus allow closing movement of said valve, said leak passages being disposed longitudinally of said chamber wall, and means for automatically decelerating said valve as it approaches said valve seat during closing, to provide for slow seating of said valve in a relatively fast closing period, said means including an apron as part of said piston in sliding contact with the inner surface of said chamber over that portion containing certain only of said passages, said apron having a window therein in the path of travel of said apron over said portion of the chamber surface causing said surface portion to be traversed by said apron only during the final portion of its return stroke.

3. A valve assembly comprising a valve housing having an intake opening and a discharge opening and a main valve seat intermediate said openings, a piston chamber in said housing and having an open end, a main valve in said housing adapted to fit said seat and having connected therewith a piston slidably receivable in the open end of said piston chamber, a by-pass passage from the interior of said piston chamber to the discharge side of said main valve, a pilot valve coupled to said main valve and normally closing said by-pass passage, means normally urging said main valve toward closing position in the absence of restraint, means involving a plurality of leak passages into said piston chamber for admitting liquid to said piston chamber behind said piston during closing of said valve to preclude creation of a vacuum condition therein and thus allow closing movement of said main valve, and means for automatically decelerating said main valve as it approaches said valve seat during closing, to provide for slow seating of said valve in a relatively fast closing period, said means including a part of said piston in sliding contact with the inner surface of said chamber over that portion containing at least one of said passages and traversed by said part of the piston only during the final portion of its return stroke.

4. A valve assembly comprising a valve housing having an intake opening and a discharge opening and a main valve seat intermediate said openings, a piston chamber in said housing in alignment with said valve seat and having an open end, a main valve in said housing adapted to fit said seat and having connected therewith a piston slidably receivable in the open end of said piston chamber, a by-pass passage from the interior of said piston chamber to the discharge side of said main valve, a pilot valve coupled to said main valve and normally closing said by-pass passage, spring means normally urging said main valve toward closing position in the absence of restraint, means involving a plurality of leak passages into said piston chamber for admitting liquid to said piston chamber behind said piston during closing of said valve to preclude creation of a vacuum condition therein and thus allow closing movement of said main valve, at least one of said leak passages being located in the chamber wall traversed by said piston, and means for automatically decelerating said main valve as it approaches said valve seat during closing, to provide for slow seating of said valve in a relatively fast closing period, said means including an apron as part of said piston in sliding contact with the inner surface of said piston traversed wall and adapted to block said leak passage as the main valve approaches seating position.

5. A valve assembly comprising a valve housing having an intake opening and a discharge opening and a main valve seat intermediate said openings, a cylindrical wall supported in said housing in alignment with said valve seat, means substantially closing that end of said cylindrical wall remote from said valve seat and leaving the opposite end open, a main valve in said housing adapted to fit said seat and having connected therewith a piston slidably receivable in the open end of said cylindrical wall to define a piston chamber, a by-pass passage from the interior of said piston chamber to the discharge side of said main valve, a pilot valve coupled to said main valve and normally closing said by-pass passage, spring means acting through said pilot valve and normally urging said main valve toward closing position in the absence of restraint, means for admitting liquid to said piston chamber behind said piston during closing of said valve to preclude creation of a vacuum condition therein and thus allow closing movement of said main valve, and means for automatically decelerating said main valve as it approaches said valve seat during closing, to provide for slow seating of said valve in a relatively fast closing period, said means including an apron as part of said piston in sliding contact with the inner surface of said cylindrical wall and adapted to restrict the admission of liquid to said piston chamber as the main valve approaches seating position.

6. A valve assembly comprising a valve housing having an intake opening and a discharge opening and a main valve seat intermediate said openings, a cylindrical wall supported in said housing in alignment with said valve seat, means substantially closing that end of said cylindrical wall remote from said valve seat and leaving the opposite end open, a main valve in said housing adapted to fit said seat and having connected therewith a piston slidably receivable in the open end of said cylindrical wall to define a piston chamber, a by-pass passage from the interior of said piston chamber to the discharge side of said main valve, a pilot valve coupled to said main valve and normally closing said by-pass passage, spring means acting through said pilot valve and normally urging said main valve toward closing position in the absence of restraint, means involving a plurality of leak passages through said cylindrical wall for admitting liquid to said piston chamber behind said piston during closing of said valve to preclude creation of a vacuum condition therein and thus allow closing movement of said main valve, and means for automatically decelerating said main valve as it approaches said valve seat during closing, to provide for slow seating of said valve in a relatively fast closing period, said means including an apron as part of said piston in sliding contact with that portion of said cylindrical wall containing certain of said leak passages, said apron having a window in line with the path of movement of said apron thereover to expose such leak passages except only as the main valve approaches seating position.

(References on following page)

References Cited in the file of this patent

UNITED STATES PATENTS

| Number | Name | Date |
|---|---|---|
| 613,802 | Kenney | Nov. 8, 1888 |
| 540,347 | Baker | June 4, 1895 |
| 851,165 | Fernald | Apr. 23, 1907 |
| 1,541,538 | Tunnell | June 9, 1925 |
| 2,000,297 | Putnam | May 7, 1935 |
| 2,039,109 | Pasman | Apr. 28, 1936 |
| 2,102,848 | Kocour | Dec. 21, 1937 |
| 2,205,033 | Dreyer et al. | June 18, 1940 |
| 2,557,378 | Granberg | June 19, 1951 |

FOREIGN PATENTS

| Number | Country | Date |
|---|---|---|
| 496,638 | Great Britain | Dec. 2, 1938 |